No. 628,942. Patented July 18, 1899.
W. JEFFERYS.
SEWER OR DRAIN PIPE OR CONDUIT FOR WATER WAYS.
(Application filed July 12, 1898.)
(No Model.)

A   B   a   b

Witnesses:
Ella Lindsay.
John D Anderson.

Inventor.
William Jefferys

United States Patent Office.

WILLIAM JEFFERYS, OF EAST ORANGE, NEW JERSEY.

SEWER OR DRAIN PIPE OR CONDUIT FOR WATERWAYS.

SPECIFICATION forming part of Letters Patent No. 628,942, dated July 18, 1899.

Application filed July 12, 1898. Serial No. 685,806. (No model.)

*To all whom it may concern:*

Be it known that I, WILLIAM JEFFERYS, a citizen of the United States, residing in the township of East Orange, in the county of Essex and State of New Jersey, have invented certain new and useful Improvements in Sewer or Drain Pipes or Conduits for Waterways; and I do hereby declare that the following is a full, clear, and exact description of the invention, which will enable others skilled in the art to which it appertains to make and use the same.

The object of my invention is to provide a sewer or drain pipe or conduit of a flexible or yielding nature, so that it will easily conform to lines of projection to be used for conducting its contents through marshy soil or submerged channels. I attain this object by the mechanism illustrated in the accompanying drawings.

Figure 1:
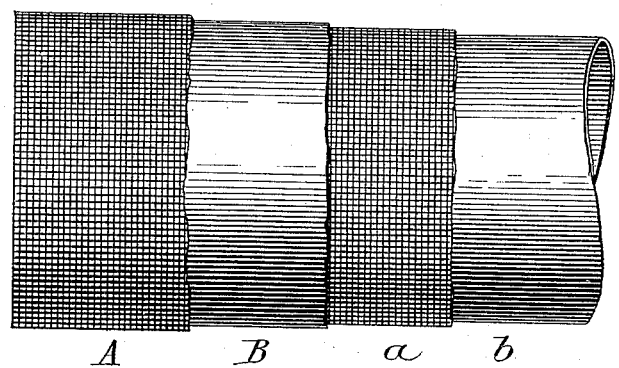
Figure 2:
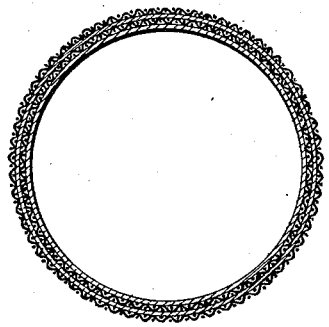

Figure 1 is a longitudinal section of the pipe or conduit, showing layers of woven or formed metal A a, alternating with sheets or layers formed of paper or other pulpous material B b, coated with a water-resisting substance or solution, which being pressed together form a compact and cohesive and flexible mass shaped in any form for conveying liquid matter. Fig. 2 is a vertical cross-section of the same.

By the application of this method the pipe or conduit is made without joints, and thus is free from leakage and, being flexible or yielding, is easily bent to a required direction, is not liable to decay or fracture, and therefore is adapted to the purpose designed.

Having fully described my invention, what I claim, and desire to secure by Letters Patent, is—

The combination of layers of woven or formed metal, coatings or layers of oily or viscous matter, and sheets or layers formed of pulpous material, alternating in regular or irregular order, forming a compact and cohesive mass, shaped for conveying liquid matter, substantially as described.

WILLIAM JEFFERYS.

Witnesses:
WILLIAM L. HIGBIE,
MONTGOMERY LINDSAY.